US006966402B2

(12) United States Patent
Matias et al.

(10) Patent No.: US 6,966,402 B2
(45) Date of Patent: Nov. 22, 2005

(54) ACOUSTICAL HEAT SHIELD

(75) Inventors: Calin Matias, London (CA); Mark Boogemans, Belmont (CA); Jason Kirkwood, Belleville, MI (US)

(73) Assignee: DANA Corporation, Toledo, OH (US)

( * ) Notice: Subject to any disclaimer, the term of this patent is extended or adjusted under 35 U.S.C. 154(b) by 138 days.

(21) Appl. No.: 10/452,895

(22) Filed: Jun. 2, 2003

(65) Prior Publication Data

US 2004/0238276 A1 Dec. 2, 2004

(51) Int. Cl.[7] .............................. E04B 1/82; F01N 7/14; B32B 3/10; B32B 15/14
(52) U.S. Cl. ..................... 181/290; 181/286; 181/296; 181/240; 60/323; 428/174; 428/201; 428/138; 442/378; 442/381; 442/394
(58) Field of Search ................. 181/290, 292, 181/294, 286, 296, 207, 240

(56) References Cited

U.S. PATENT DOCUMENTS

| | | | |
|---|---|---|---|
| 2,045,733 A | * 6/1936 | Spafford | 428/177 |
| 4,093,482 A | * 6/1978 | Ogata et al. | 181/290 |
| 4,619,344 A | * 10/1986 | Uesugi et al. | 181/229 |
| 4,687,697 A | * 8/1987 | Cambo et al. | 428/201 |
| 4,709,781 A | 12/1987 | Scherzer | |
| 5,057,176 A | * 10/1991 | Bainbridge | 181/290 |
| 5,100,733 A | * 3/1992 | Yoshida et al. | 428/462 |
| 5,139,839 A | * 8/1992 | Lim | 428/76 |
| 5,196,253 A | 3/1993 | Mueller et al. | |
| 5,334,806 A | * 8/1994 | Avery | 181/286 |
| 5,424,139 A | * 6/1995 | Shuler et al. | 428/596 |
| 5,464,952 A | * 11/1995 | Shah et al. | 181/211 |
| 5,590,524 A | 1/1997 | Moore, III et al. | |
| 5,665,943 A | * 9/1997 | D'Antonio | 181/295 |
| 5,792,539 A | * 8/1998 | Hunter | 428/72 |
| 5,945,643 A | * 8/1999 | Casser | 181/290 |
| 6,026,846 A | * 2/2000 | Wolf et al. | 137/375 |
| 6,251,498 B1 | 6/2001 | Fukushima et al. | |
| 6,305,494 B1 | * 10/2001 | Pfaffelhuber et al. | 181/286 |
| 6,328,513 B1 | * 12/2001 | Niwa et al. | 411/339 |
| 6,451,447 B1 | 9/2002 | Ragland et al. | |
| 6,465,110 B1 | * 10/2002 | Boss et al. | 428/608 |
| 6,581,720 B1 | * 6/2003 | Chen et al. | 181/205 |
| 6,681,890 B1 | * 1/2004 | Chen et al. | 181/291 |
| 2004/0142152 A1 | * 7/2004 | Chen et al. | 428/174 |

FOREIGN PATENT DOCUMENTS

| | | | | |
|---|---|---|---|---|
| GB | 2 152 431 A | | 8/1985 | |
| JP | 09049426 A | * | 2/1997 | ............. F01N/7/14 |
| JP | 09242561 A | * | 9/1997 | ........... F02B/77/13 |
| JP | 2001065363 A | * | 3/2001 | ........... F02B/77/11 |
| WO | WO-90/12168 | | 10/1990 | |
| WO | WO-97/36743 | | 10/1997 | |

OTHER PUBLICATIONS

International Search Report (2 pages).

\* cited by examiner

Primary Examiner—Edgardo San Martin

(57) ABSTRACT

A heat shield includes an inner portion, an outer portion, first and second insulating portions, and a deflecting portion. The inner portion includes a reflective material to reflect thermal energy that radiates from a heat/acoustic source. The outer portion includes a rigid material to provide structural support for the heat shield. The first and second insulating portions are intermediately positioned between the inner and outer portions. The deflecting portion is intermediately positioned between the first and second insulating portions to deflect acoustics from the heat/acoustic source. A method for manufacturing the heat shield is also disclosed.

22 Claims, 10 Drawing Sheets

ACOUSTICAL HEAT SHIELD

BACKGROUND OF THE INVENTION

1. Field of Invention

The present invention relates to improvements in heat shields for internal combustion engines, and more particularly to heat shields having improved acoustic and heat dampening features.

2. Description of the Prior Art

Those skilled in the art will appreciate the issues involved in the dampening of undesirable acoustics and heat generated by automotive components, such as, for example, exhaust manifolds. Known heat shields that provide acoustic dampening may include multiple aluminum foil layers with embossments. Typically, the embossments are positioned in a staggered relationship to contact and space opposing foil layers. However, because the embossments directly contact the opposing foil layers, undesirable noise issues, such as rattle, may occur as a result of the vibrations of the embossments against the foil layers.

Other known heat shields comprise a three-layer structure including inner and outer metal layers with an intermediately disposed sound and heat shielding layer. Such three-layer heat shields have design restrictions that require the inner and outer layers to include different thicknesses so as to provide resonant frequencies that dampen undesirable acoustics. Even further, such three-layer heat shields undesirably require that the intermediately disposed sound and heat shielding layer includes a relatively large thickness in comparison to the inner and outer layers to fully damp the sound and heat to operable levels.

Thus, there is a need for an alternative heat shield that may overcome the undesirable fallbacks of traditional heat shields.

SUMMARY OF THE INVENTION

The disclosed invention provides a heat shield including an inner portion, an outer portion, first and second insulating portions, and a deflecting portion. The inner portion includes a reflective material to reflect thermal energy that radiates from a heat/acoustic source. The outer portion includes a rigid material to provide structural support for the heat shield. The first and second insulating portions are intermediately positioned between the inner and outer portions. The deflecting portion is intermediately positioned between the first and second insulating portions to deflect acoustics from the heat/acoustic source.

The disclosed invention also provides a method for manufacturing the heat shield. The method includes the steps of blanking the outer portion to form a hemmed portion, positioning the first insulating portion over the outer portion, positioning the deflecting portion over the first insulating portion, positioning the second insulating portion over the deflecting portion, positioning the inner portion over the second insulating portion, and hemming the hemmed portion of the outer portion about a periphery of the heat shield defined by the first insulating portion, the deflecting portion, the second insulating portion, and the inner portion.

DETAILED DESCRIPTION OF THE EMBODIMENTS

Figure 1:
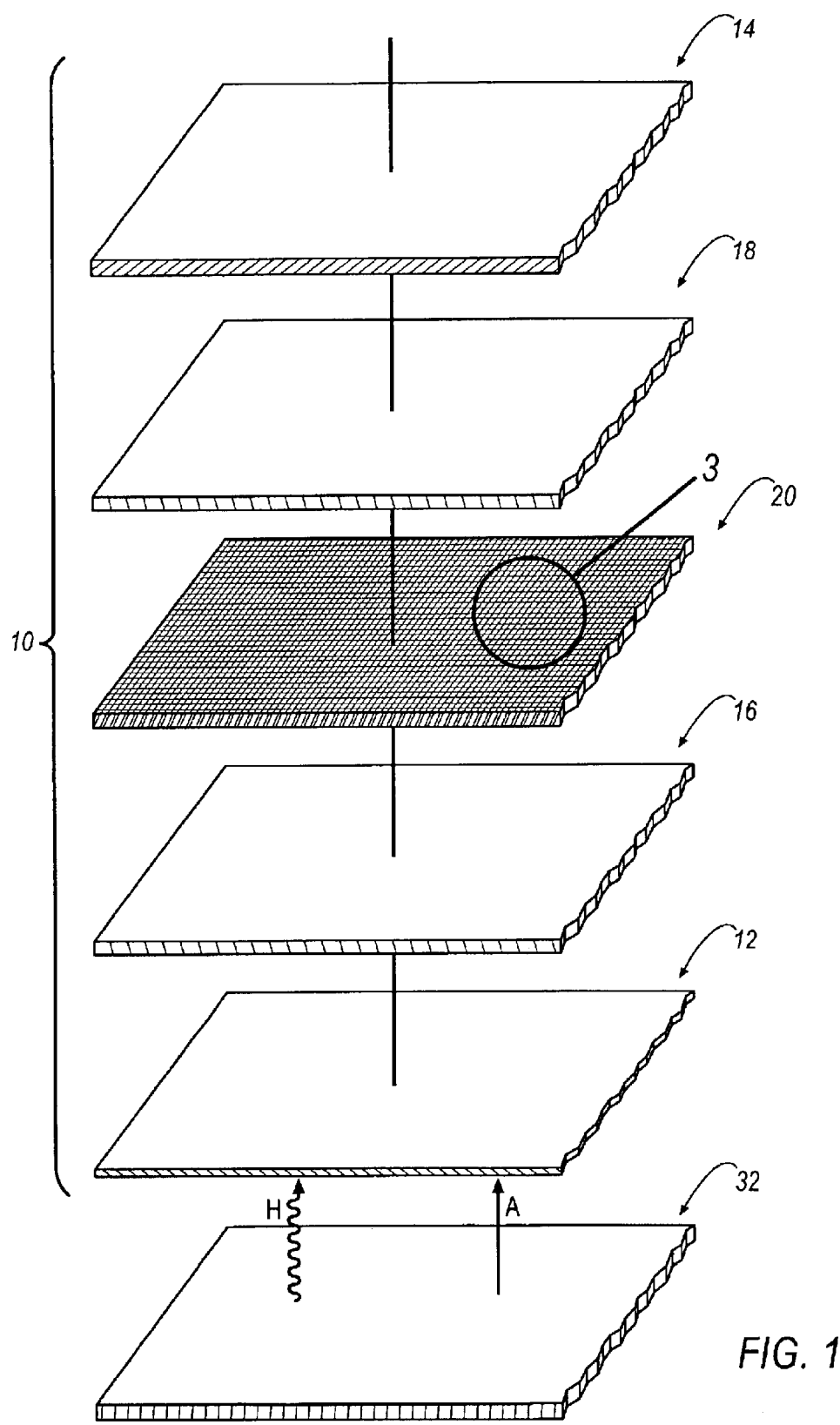
FIG. 1 is an exploded perspective view of a heat shield according to one embodiment of the invention.

Referring initially to FIG. 1, components comprising a heat shield 10 in accordance with the present invention are shown in exploded form. As illustrated, the heat shield 10 includes an inner portion 12 and outer portion 14 that are spaced by insulating portions 16, 18 with an intermediately positioned deflecting portion 20. The outer portion 14 is constructed from a rigid material to provide structural support for the heat shield 10, and, as seen more clearly in FIG. 2, the inner portion 12 comprises a reflective material to reflect undesirably produced thermal energy, or heat, which is generally shown at H, that radiates from a heat/acoustic source 32. The deflecting portion 20 includes a material that is defined by a plurality of dimples 22 and dual air pockets 24 (FIGS. 3A–4D) that deflect undesirably produced acoustics, A, from the heat/acoustic source 32.

Figure 2:
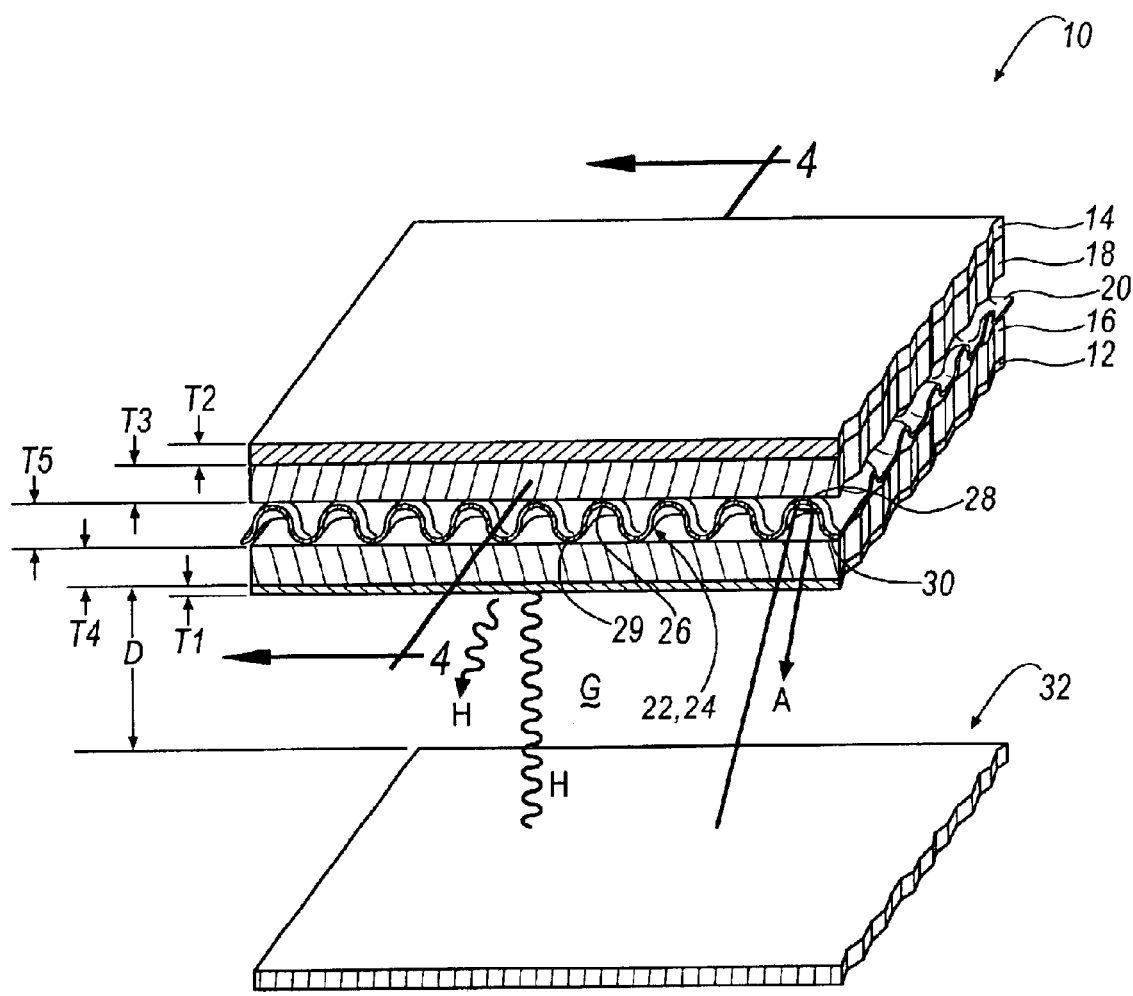
FIG. 2 is an assembled side view of a portion of the heat shield of Figure of FIG. 1.

According to the illustrated embodiment, the inner portion 12, the outer portion 14, and the insulating portions 16, 18 preferably each includes aluminized clad, aluminized steel, and mineral fibers, respectively, to provide adequate heat absorption, structural support, and insulation. As seen in FIG. 2, the inner and outer portions 12, 14 include first and second thickness, T1 and T2, and the insulating portions 16, 18 include third and forth thicknesses, T3 and T4. The thicknesses T1, T2, T3 and T4 may include any desirable thickness. For example, thickness, T1, may preferably range between approximately 0.15 mm–0.40 mm, thickness, T2, may preferably range between approximately 0.30 mm–0.60 mm, and thicknesses, T3, T4, may preferably range between approximately 0.50 mm–3.00 mm. Although any desirable thickness not included in any of the ranges listed may be incorporated in the design of the heat shield 10, the above described thickness ranges provide optimal weight and performance characteristics of the heat shield 10.

In conjunction with the illustrated embodiment of the heat shield 10, the thickness, T1, may be approximately equal to 0.15 mm, the thickness, T2, may be approximately equal to 0.40 mm, the thickness, T3, may be approximately equal to 0.92 mm, and the thickness, T4, may be approximately equal to 0.92 mm. The thickness, T1, of the inner portion 12 is thinner in comparison to the thickness, T2, of the outer portion 14 to decrease the overall weight of the heat shield 10. Aside from weight considerations, the primary function of the inner portion 12 is to provide a reflective surface as opposed to a relatively thicker, rigid surface that the outer portion 12 defines at T2. Although the insulation portions 16, 18 in the described example have the same thicknesses, T3, T4, it is important to consider that the insulation portions 16, 18 may have any desirable thickness. Also, other thickness values for T1, T2, T3, and T4 that do not fall within the preferable ranges listed above may be implemented in other embodiments; however, greater thicknesses of T1, T2, T3, and T4 may undesirably introduce clearance issues and increase the cost and weight of the heat shield 10.

Other embodiments of the heat shield 10 may comprise inner and outer portions 12, 14 that include any other desirable materials such as stainless steel, nickel, or the like. Even further, the insulating portions 16, 18 may include any other desirable fiber, such as graphite fiber, ceramic fiber, or the like. Although alternate materials such as ceramic fiber, graphite fiber, and nickel perform adequately when implemented in the design of the above-described heat shield 10, ceramic fiber, graphite fiber, and nickel tend to also increase the overall cost and weight of the heat shield 10. Yet even further, mineral fibers are preferable for implementation in the design of the heat shield 10 in favor of ceramic and graphite fibers because mineral fibers are nearly 100% recyclable.

Referring now to FIG. 2, the deflecting portion 20 includes any desirable rigid material, such as steel, having any desirable thickness, T5, which is measured from the dimple peak 26 on an upper surface 28 to the dimple valley 29 on a lower surface 30. As illustrated, the dimples 22 and air pockets 24 are formed on an upper surface 28 and lower surface 30 of the deflecting portion 20. The thickness, T5, may range from approximately 0.90 mm–1.50 mm. According to the illustrated embodiment, the thickness, T5, is approximately equal to 0.91 mm.

Functionally, the dimples 22 and air gaps 24 function in the dissipation of undesirable noise energy, or acoustics, A, that radiate from the heat/acoustic source 32, which may be an automotive component, such as an exhaust manifold. If the heat/acoustic source 32 is an exhaust manifold, it is preferable to space the exhaust manifold and heat shield 10 by a distance, D, such that an air gap, G, (FIG. 2) is formed between the exhaust manifold and the heat shield 10. The distance, D, may be any desirable length. One possible implementation of the heat shield 10 may include a distance, D, from the acoustic/heat source 32 that falls between the range of approximately 8.0 mm–15.0 mm.

The dissipation of the acoustics, A, is illustrated in FIG. 2 such that the acoustics, A, travel in a path from the heat/acoustics source 32 and are deflected or broken-up upon encountering the deflecting portion 20. The insulating portions 16, 18 complement the function of the deflecting portion 20 by providing pre- and post-damping of the acoustics, A, while also functioning in isolating the inner, outer, and deflecting portions 12, 14, 20. If the insulating portions 16, 18 were not included in the design of the heat shield 10, the inner, outer and deflecting portions 12, 14, 20, may otherwise produce inherently undesirable acoustics, such as rattle, that would typically occur as a result of the vibrations emitted from the inner, outer, and deflecting portions 12, 14, 20. Even further, the insulating portions 16, 18 provide a secondary barrier to absorb the undesirable acoustics, A, that may not be entirely damped by the deflecting portion 20 in the event that the noise energy of the acoustics, A, increase past the design threshold of the deflecting portion 20.

Figure 3A:
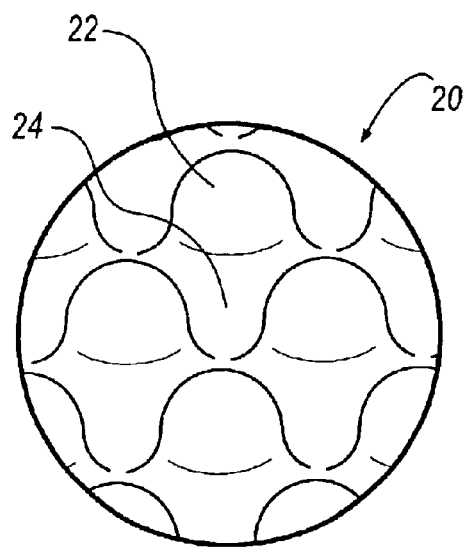
FIG. 3A is a magnified view of a surface of the heat shield portion that opposes an insulation portion of the heat shield, which is referenced from line 3 of FIG. 1.
Figure 3B:
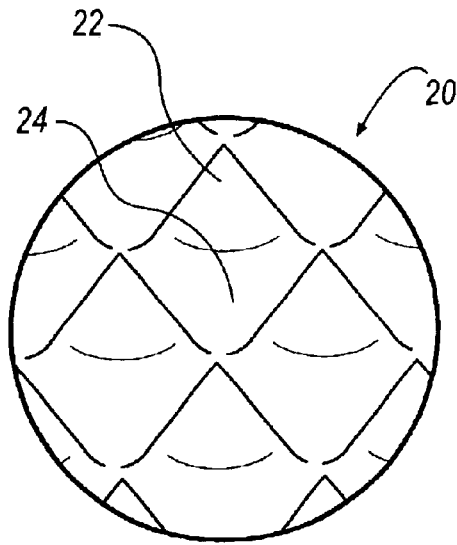
FIGS. 3B–3D are magnified views of alternative embodiments of the heat shield surface illustrated in FIG. 3A.
Figure 3C:
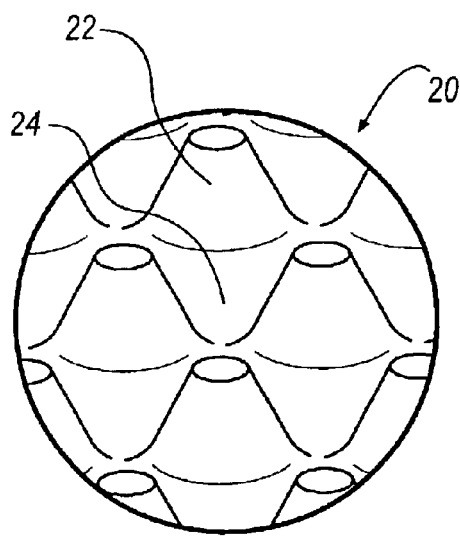
Figure 3D:
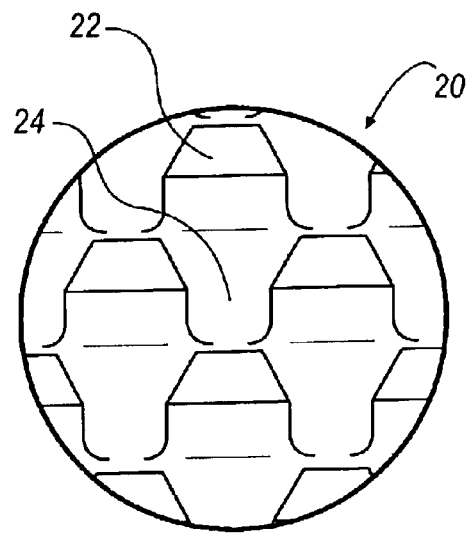

Referring to FIGS. 3A–3D, the dimples 22 may have any desirable shape that functions in the dissipation of acoustics, A, and heat, H. For example, the dimples 22 may have a generally spherical (FIG. 3A), pyramid (FIG. 3B), conical (FIG. 3C), or trapezoidal shapes (FIG. 3D). As illustrated, the dimples 22 are distributed in an offset row and column pattern; however, the dimples 22 may alternatively comprise a uniform row and column distribution or a randomized non-uniform distribution.

As seen in the illustrated embodiment, the deflecting portion 20 generally includes an even distribution dimples 22 and air gaps 22. In this example, because there is an even distribution of dimples 22 and air gaps 24, acoustic and heat dissipation performance is matched (i.e. there is an approximate one-to-one ratio of dimples 22 and air gaps 24). However, if the amount of dimples 22 is decreased (i.e. a larger air gap field is created), acoustic dissipation may be compromised in favor of providing improved heat absorption characteristics as a result of the heat, H, being forced to travel through more air. Conversely, the dimples 22 may be formed to a shape that minimizes the air gaps 24, and the acoustic dissipation characteristics may improved as the heat absorption characteristics may be compromised.

Figure 4A:
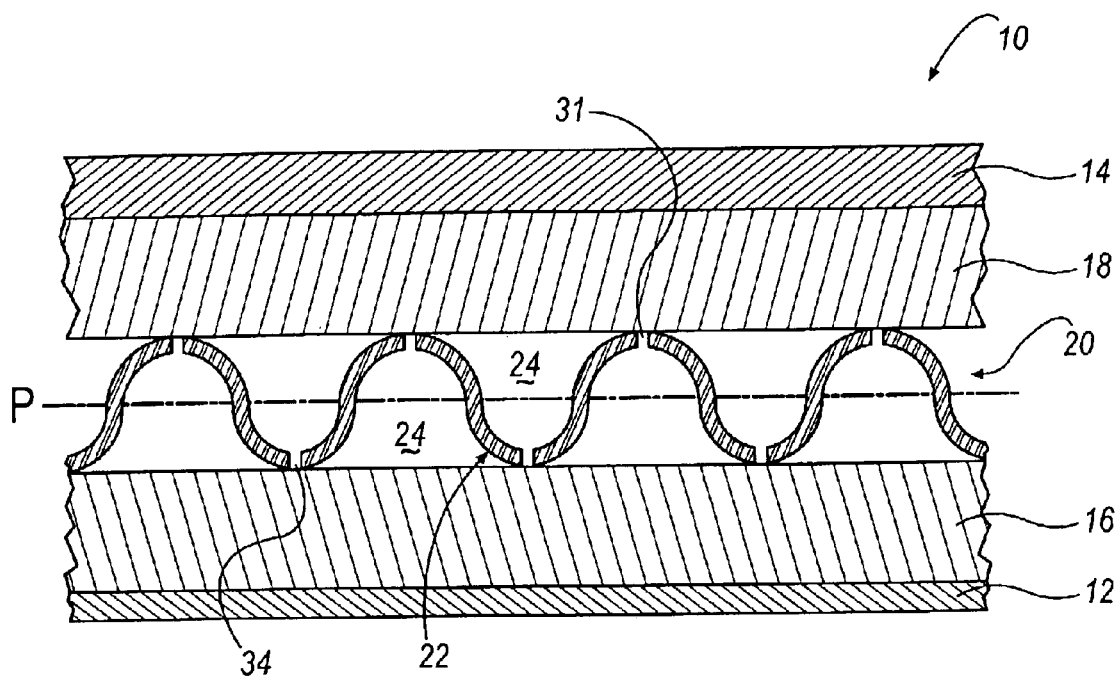
FIG. 4A is a cross-sectional view of the heat shield portion of FIG. 3A, taken along lines 4—4 of FIG. 2.
Figure 4B:
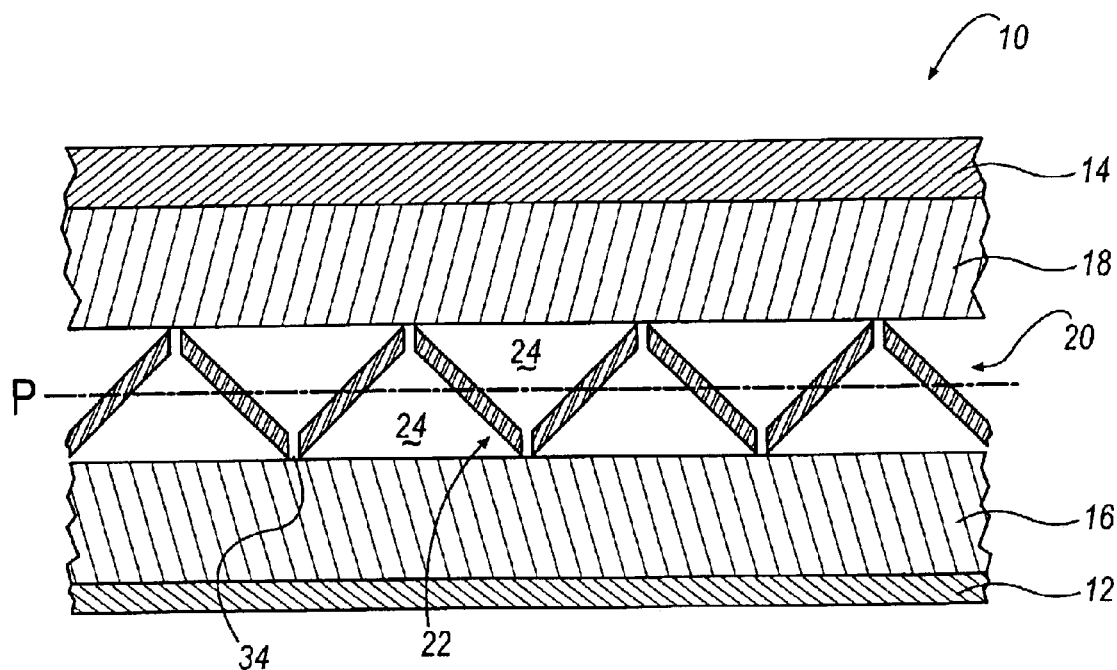
FIGS. 4B–4D are cross-sectional views of alternate embodiments of the heat shield surface illustrated in FIG. 4A, which corresponds to the magnified views illustrated in FIGS. 3B–3D.
Figure 4C:
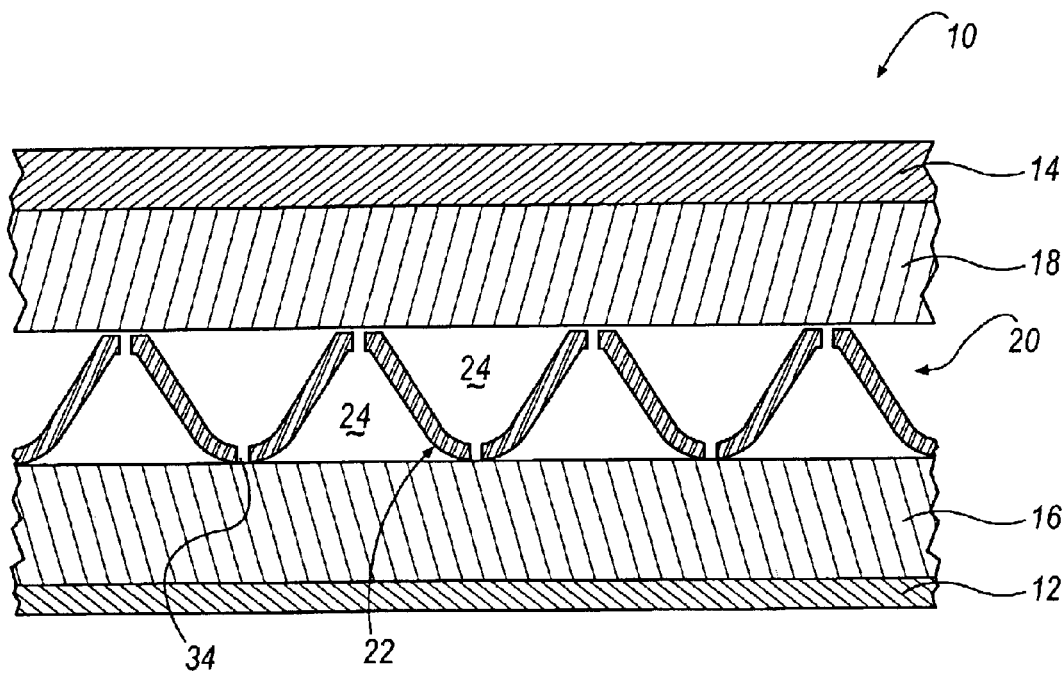
Figure 4D:
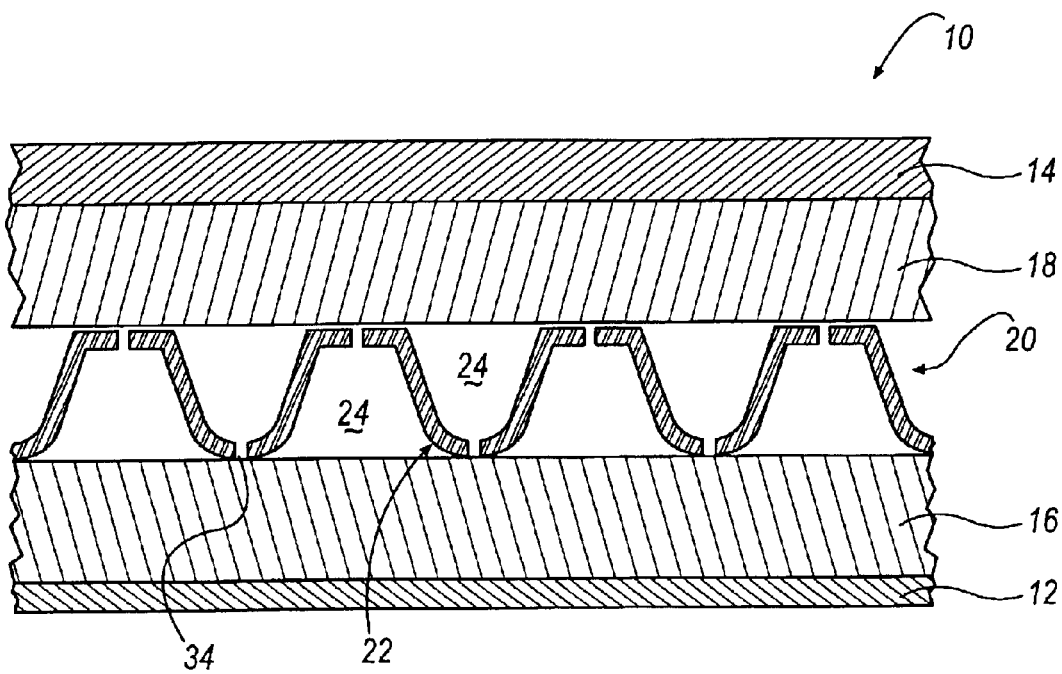

As seen more clearly in FIGS. 4A and 4B, the dimples 22 and air gaps 24 may be symmetrically disposed about a plane, P. Alternatively, as seen in FIGS. 4C and 4D, the dimples 22 and air gaps 24 may be disposed in a non-symmetric pattern. Referring to each of the illustrated embodiments in FIGS. 4A–4D, the deflecting portion 20 may also include perforations 34 that are generally disposed about the dimple peaks 26 and valleys 29 on the upper and lower surfaces 28, 30 of the deflecting portion 20. Functionally, the perforations 34 may increase the size of the air gap 24 by permitting each air gap 24 to be bounded by each insulating portion 16, 18 about the deflecting portion 20. Also, the perforations 34 may permit compression of the dimples 22 about opposing perforation surfaces 31 if an undesirable load is applied to the heat shield 10.

Although generally symmetric or non-symmetric geometric shapes are suggested for the dimples 22, it is contemplated that the dimples 22 may include other shapes or designs including perforations 34 or openings that do not necessarily face the insulating portions 16, 18 in a perpendicular relationship. For example, the deflecting portion 20 may comprise a texture or grain that creates dimple-like features including minimized air gaps 24. One possible deflecting portion 20 may include a high-density wire mesh. In this instance, the deflecting portion 20 does not necessarily include symmetric or geometrically controlled dimples 22 and air passages or gaps 24, but rather, a textured surface to dissipate acoustics, A, as well as minimized air passages or gaps 24 that assists in the absorption of heat, H. Another embodiment of the absorption portion 20 may include a generally honeycomb-shaped surface. While a honeycomb-shaped surface may increase heat absorption performance and structural rigidity of the heat shield 10 by providing air gaps 24, the honeycomb design may compromise the overall performance of the acoustic dampening by providing relatively flat upper and lower surfaces 28, 30 that do no include dimples 22.

Figure 5:
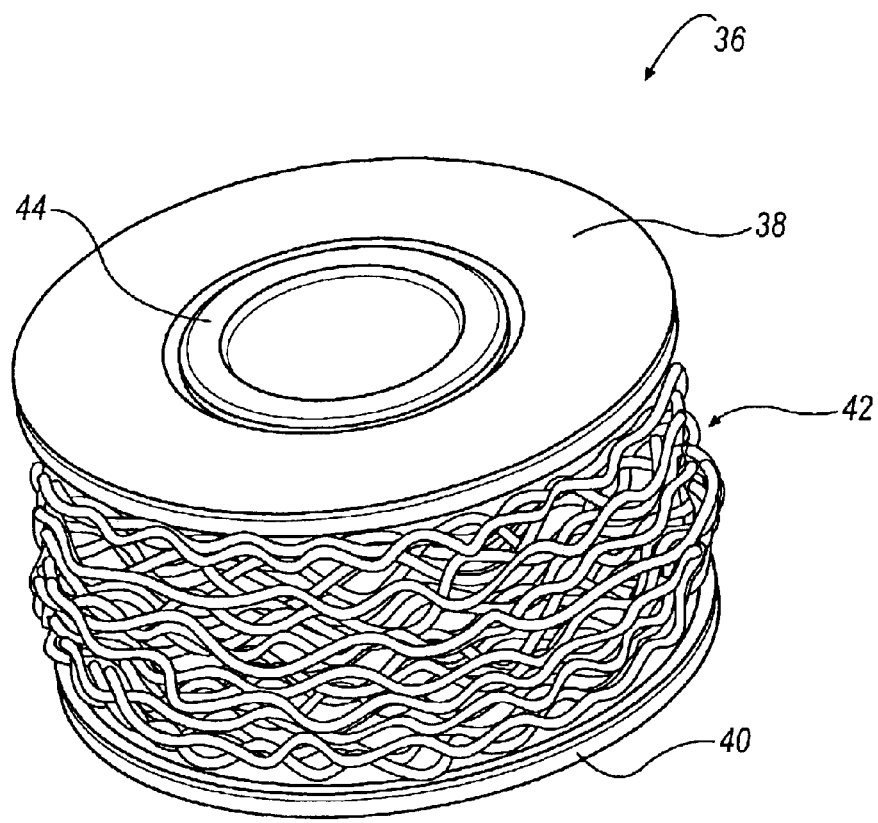
FIG. 5 is a perspective view of an isolator adapted for coupling to the heat shield illustrated in FIG. 1.

If desired, the heat shield 10 may also include isolators 36 that assist in damping vibrations applied to the heat shield 10 from the heat/acoustic source 32. As illustrated in FIG. 5, the isolator 36 includes top and bottom cold rolled steel washers 38, 40 crimped about a stainless steel mesh 42 positioned about an outer periphery of a low bearing tube 44. Essentially, the isolator 36 is fastened to the heat shield 10 via grooves that may be formed in the inner portion 12 that interlocks with the steel mesh 42. Once interlocked on the heat shield 10, the isolators 36 are positioned in an opposing relationship to the acoustic/heat source 32. According to one embodiment of the invention, the isolator 36 may include a diameter approximately equal to 20.0 mm and a height approximately equal to 5.0 mm.

Figure 6A:
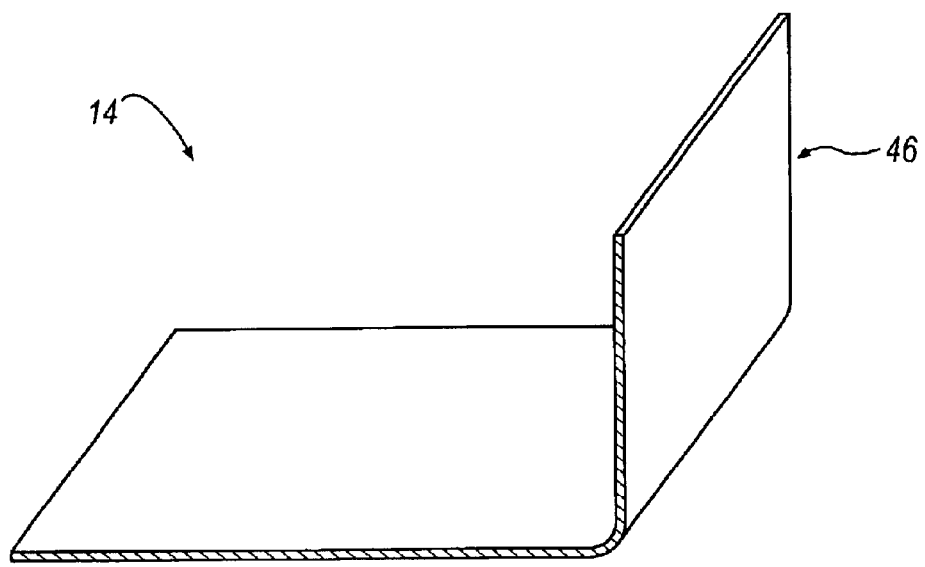
FIGS. 6A–6H illustrates an assembly process for forming the heat shield of FIG. 1.
Figure 6B:
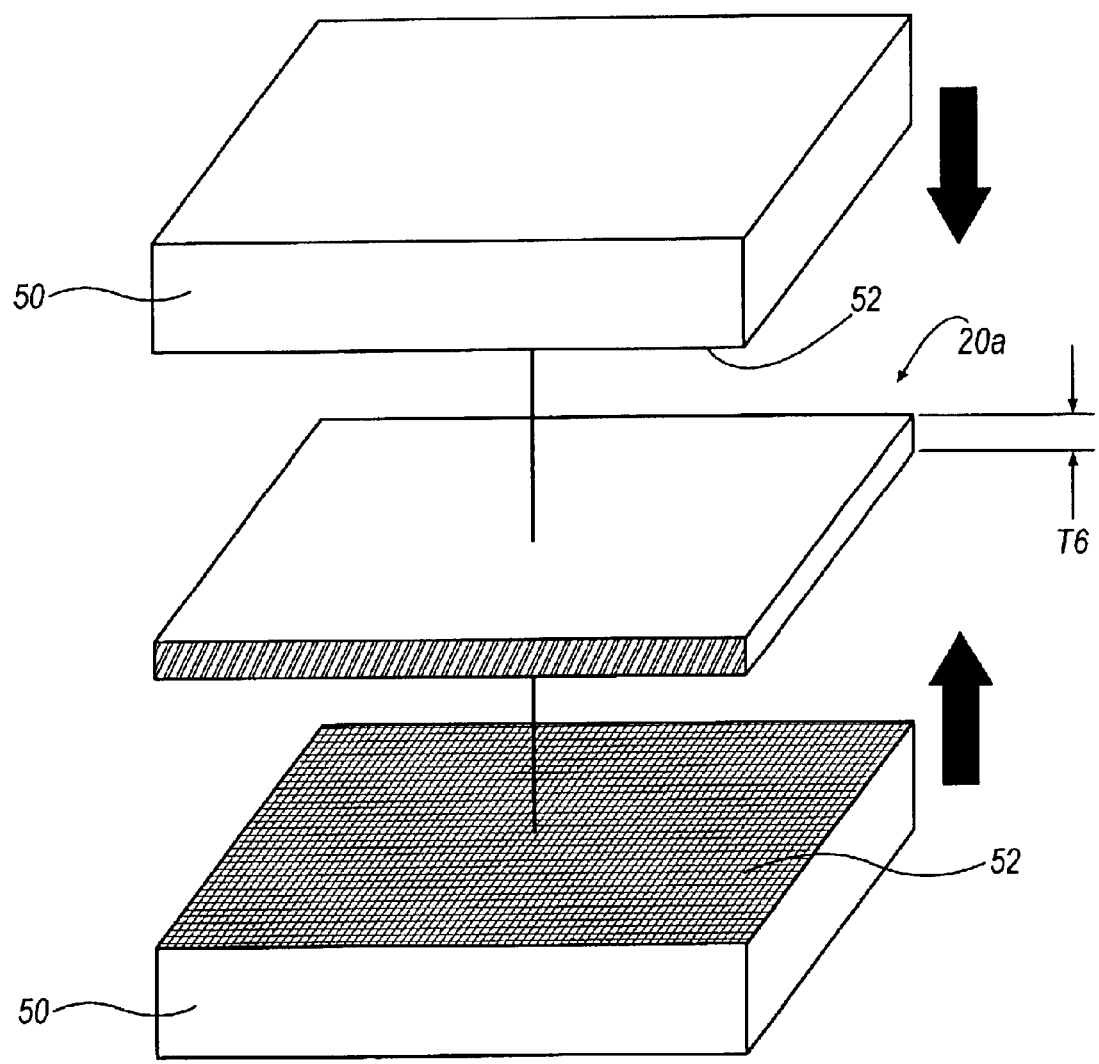
Figure 6C:
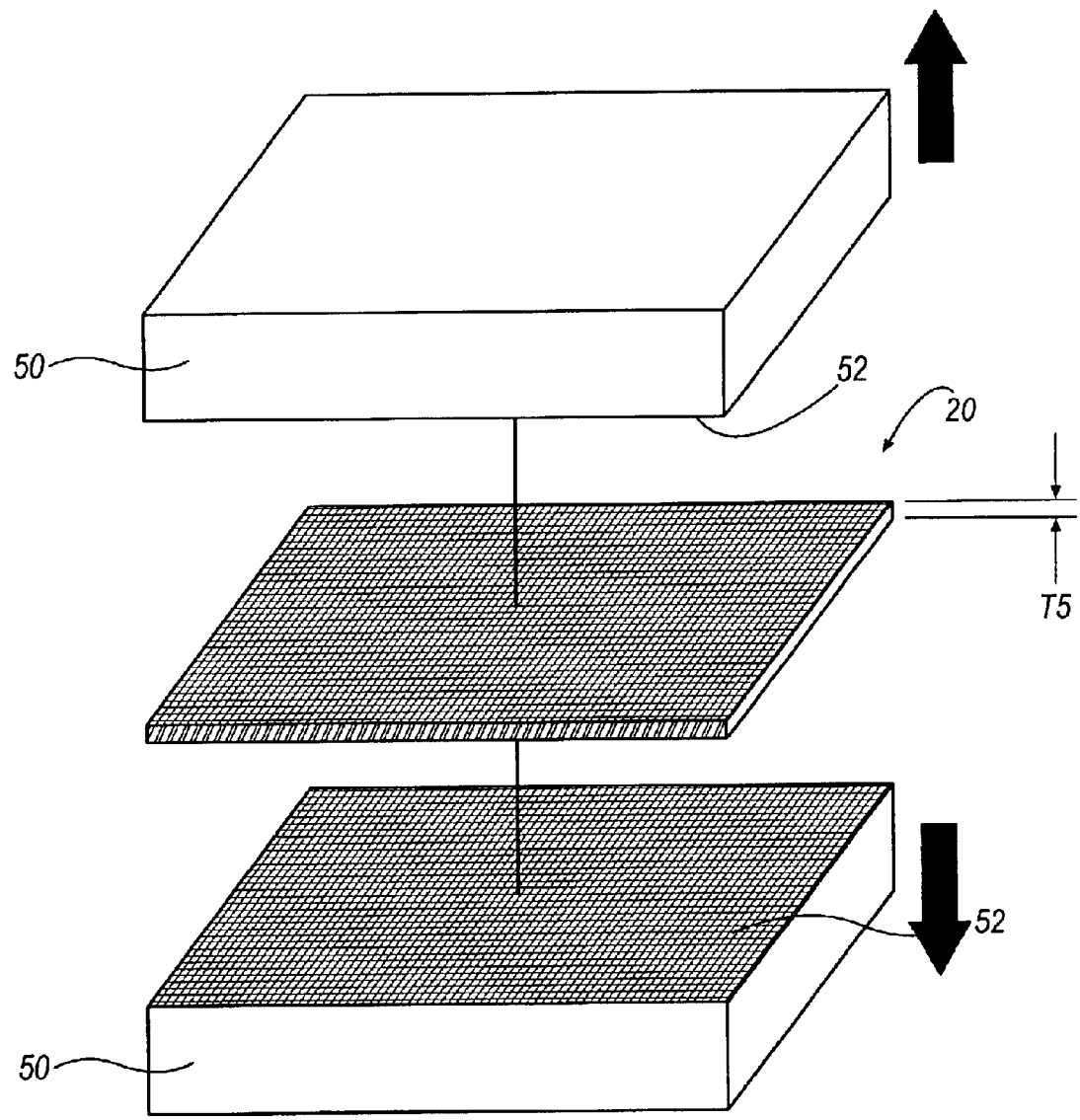
Figure 6D:
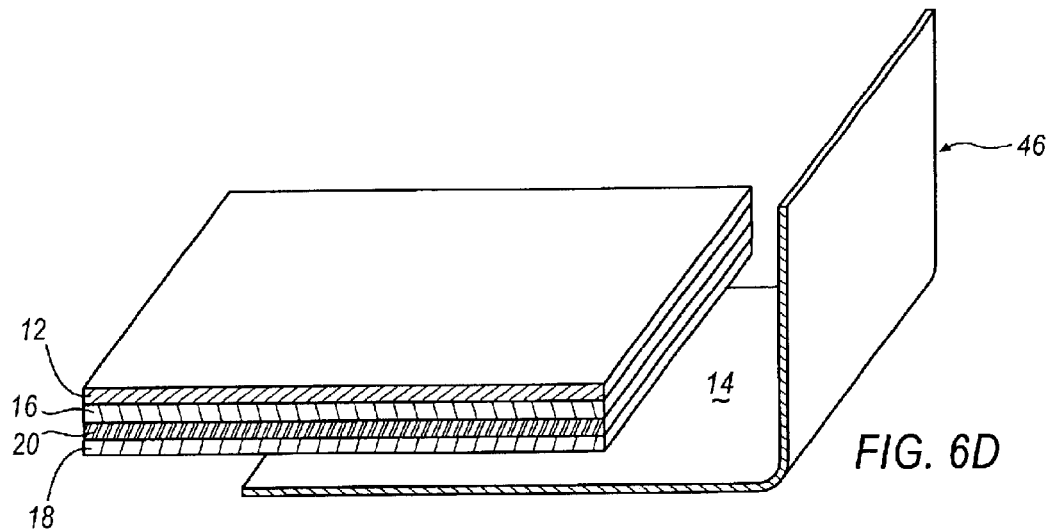

Referring now to FIGS. 6A–6H, a process for assembling the heat shield 10 is illustrated. First, as seen in FIG. 6A, the outer portion 14 is blanked to form a hemmed portion 46 for subsequent closing to form a hemmed edge 48 (FIG. 6D). Then, as seen in FIGS. 6B and 6C, a blank of steel or other suitable rigid material 20a is inserted into a press or die 50 having a textured surfaces 52 corresponding to the desired shape of the dimples 22. After inserting the steel blank 20a, the press or die 50 is closed to form the deflecting portion 20 including the dimples 22. Prior to forming the dimples 22, the steel blank 20a may include any desirable thickness, T6, that ranges between approximately 0.15 mm–0.40 mm. As stated above, after the press or die 50 is closed, the dimples 22 define the thickness, T5, that may range between 0.90 mm–1.50 mm.

Figure 6E:
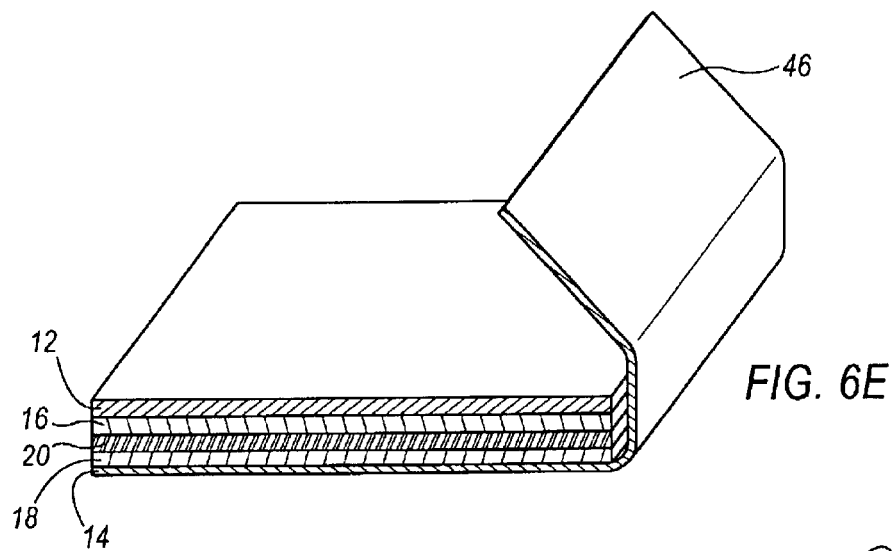
Figure 6F:
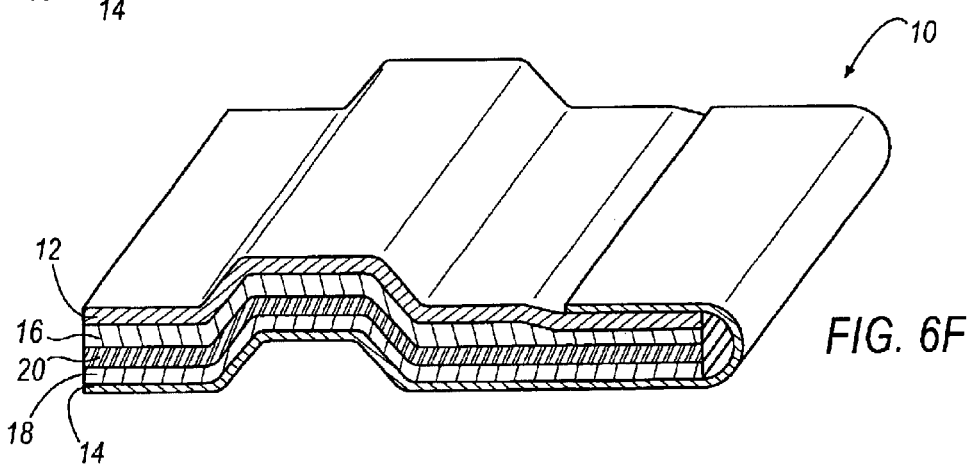
Figure 6G:
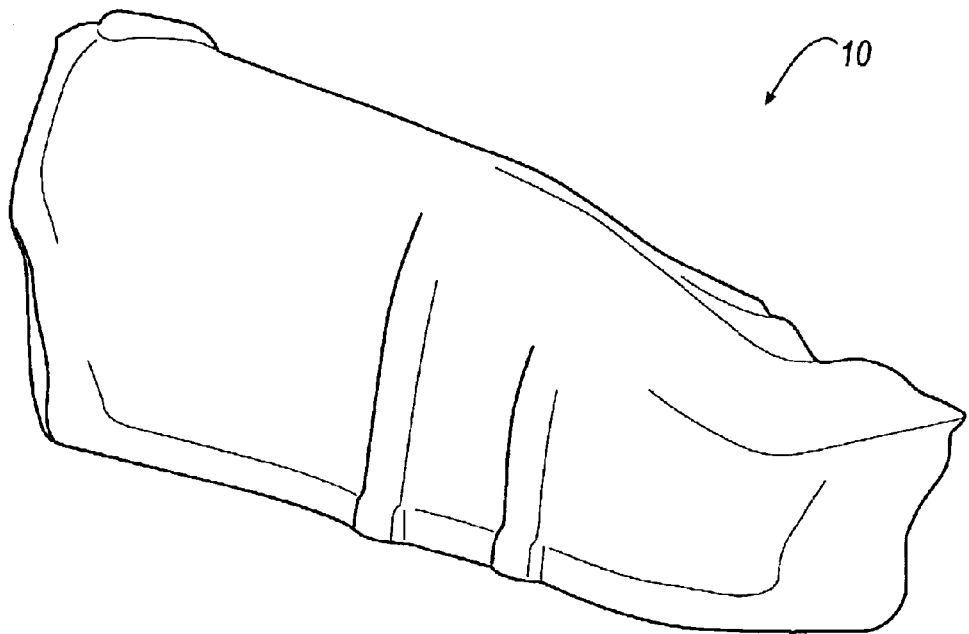

Next, as seen in FIG. 6D, the insulating portion 18 is positioned over the outer portion 14; the deflecting portion 20 is positioned over the insulating portion 18; the insulating portion 16 is positioned over the deflecting portion 20; and the inner portion 12 is positioned over the insulating portion 16. After the portions 12, 14, 16, 18, 20 are properly positioned, the hemmed portion 46 is pre-closed, as see in FIG. 6D, so that the outer portion 14 may be subsequently closed in a beading step to form the hemmed edge 48, as seen in FIGS. 6E and 6F. Although shown in a partial side view, it is important to note that the hemming process illustrated in FIGS. 6A–6F includes the hemmed structural edge 48 about the entire periphery of the heat shield 10 to fully secure each portion 12, 16, 18, 20 stacked therein.

Figure 6H:
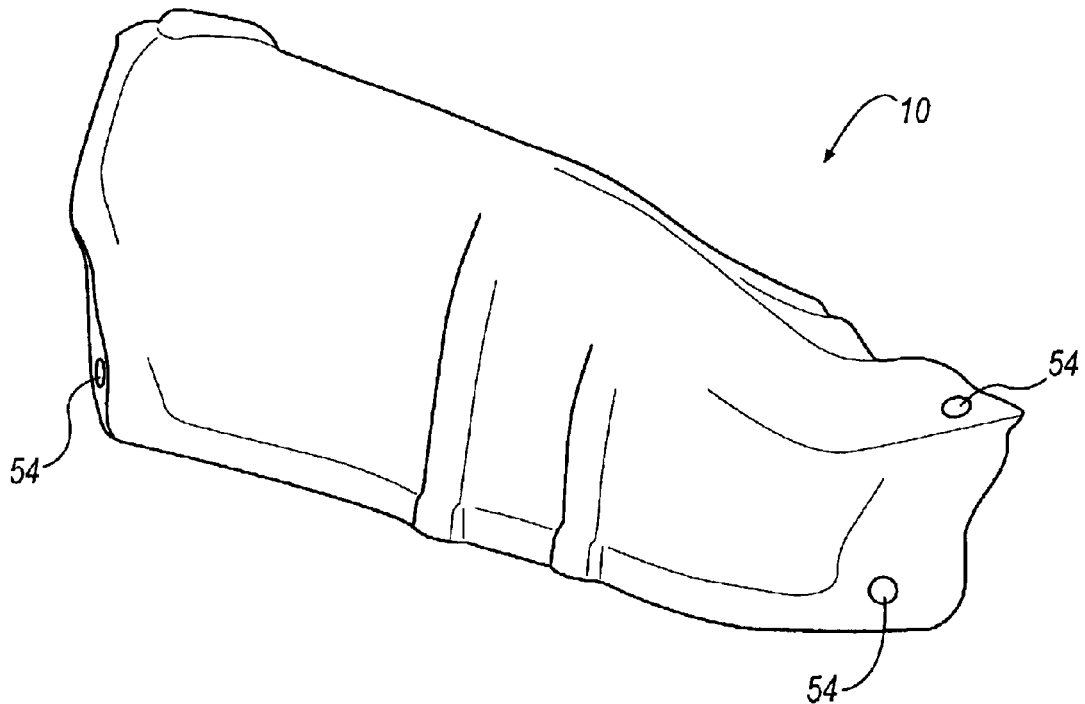

Then, if desired, heat shield 10 may be formed to a desired contour, such as, for example, the contour of an exhaust manifold (FIG. 6G), and subsequently stamped or punch to include passages 54 for fasteners, such as bolts (FIG. 6H). Although steps illustrated in FIGS. 6B and 6C are directed to the formation of the dimples 22, it is contemplated that the deflecting portion 20 may be a preformed component, that is, if a wire mesh is implemented, and the dimple formation steps illustrated in FIGS. 6B and 6C may be eliminated. The heat shield 10 may include additional bracket attachments (not shown) that comprise the same components of the heat shield 10. Essentially, the bracket may be riveted to the heat shield 10 to provide a heat shield extension, for other components close to the acoustic/heat source 32. As stated above, if the acoustic/heat source 32 is an exhaust manifold, the bracket may shield other automotive components from the manifold, such as a spark plug. In an automotive application as explained above, the heat shield 10, may withstand thermal temperatures of approximately 650° C. (1202° F.) for exhaust manifolds that have operating temperatures as high as 900° C. (1652° F.). If the inner portion 12, which provides the primary heat reflecting barrier, includes nickel rather than aluminum, the heat shield 10 may withstand temperatures higher than 650° C. (1202° F.). The heat shield 10 includes a material formation and composition that includes strength characteristics, corrosion resistance, and other user parameters. For example, the materials described above provide resistance to corrosion as a result of constituents including: the elements, salt, engine fluids, and high temperatures of the manifold.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A heat shield comprising:
   an inner portion and outer portion, wherein the inner portion includes a reflective material to reflect thermal energy that radiates from a heat/acoustic source, wherein the outer portion includes a rigid material to provide structural support for the heat shield;
   first and second insulating portions intermediately positioned between the inner and outer portions; and
   a deflecting portion intermediately positioned between the first and second insulating portions that deflects acoustics from the heat/acoustic source.

2. The heat shield according to claim 1, wherein the deflecting portion material is constructed of steel.

3. The heat shield according to claim 1, wherein dimples and air pockets are formed on an upper surface and lower surface of the deflecting portion.

4. The heat shield according to claim 3, wherein the dimples may be formed to a geometric shape, wherein the geometric shape is selected from the group consisting of a spherical shape, a pyramid shape, a conical shape, and a trapezoidal shape.

5. The heat shield according to claim 3, wherein the dimples are distributed in offset rows and columns.

6. The heat shield according to claim 3, wherein the dimples are distributed in a uniform row and column pattern.

7. The heat shield according to claim 3, wherein the dimples are distributed in a randomized non-uniform pattern.

8. The heat shield according to claim 3, wherein the dimples and air gaps are symmetrically disposed about a plane.

9. The heat shield according to claim 3, wherein the dimples and air gaps are non-symmetrically disposed about a plane.

10. The heat shield according to claim 3, wherein the dimples include perforations disposed about dimple peaks located on the upper surface of the deflecting portion, and about dimple valleys located on the lower surface of the deflecting portion.

11. The heat shield according to claim 10, wherein the deflecting portion includes a thickness defined by the dimple peaks on an upper surface to the dimple valleys on a lower surface.

12. The heat shield according to claim 1, wherein the deflecting portion may comprise a high-density wire mesh or honeycomb-shaped surface.

13. The heat shield according to claim 1, wherein the inner portion material includes aluminized clad, the outer portion material includes aluminized steel, and the insulating portions includes a mineral fiber material.

14. The heat shield according to claim 1, wherein the heat/acoustic source is an exhaust manifold.

15. The heat shield according to claim 14, wherein the heat shield is spaced from the exhaust manifold by a predetermined distance so as to form an air gap between the exhaust manifold and the heat shield.

16. The heat shield according to claim 1 further comprising at least one isolator that damps vibrations applied to the heat shield from the heat/acoustic source.

17. The heat shield according to claim 16, wherein the isolator includes top and bottom cold rolled steel washers crimped about a stainless steel mesh that are positioned about an outer periphery of a low bearing tube.

18. A method for manufacturing a heat shield comprising the steps of:
   blanking an outer portion to form a hemmed portion;

positioning a first insulating portion over the outer portion;

positioning an acoustic and heat deflecting portion over the first insulating portion;

positioning a second insulating portion over the deflecting portion;

positioning an inner portion over the second insulating portion; and hemming the hemmed portion of the outer portion about a periphery of the heat shield defined by the first insulating portion, the deflecting portion, the second insulating portion, and the inner portion.

19. The method according to claim 18 further comprising the step of forming said deflecting portion by blanking a rigid material in a press or die having a textured surface so as to produce dimples and air gaps on the deflecting portion.

20. The method according to claim 18 further comprising the step of forming the heat shield to a contour of a component that shields acoustics and heat.

21. The method according to claim 18 further comprising the step of forming passages in the heat shield.

22. A heat shield comprising:

an inner portion having a first thickness approximately equal to 0.15 nm and an outer portion having a first thickness approximately equal to 0.40 mm, wherein the inner portion includes a reflective material to reflect thermal energy that radiates from a heat/acoustic source, and wherein the outer portion includes a rigid material to provide structural support for the heat shield;

a first insulating portion having a first thickness approximately equal to 0.92 mm and a second insulating portion having a first thickness approximately equal to 0.92 mm, intermediately positioned between the inner and outer portions; and a deflecting portion that includes a first thickness approximately equal to 0.91 mm, intermediately positioned between the first and second insulating portions that deflects acoustics from the heat/acoustic source.

* * * * *